July 9, 1957  H. R. MILLER  2,798,937
MULTIPLE ARC TIMING SYSTEM
Filed May 16, 1955
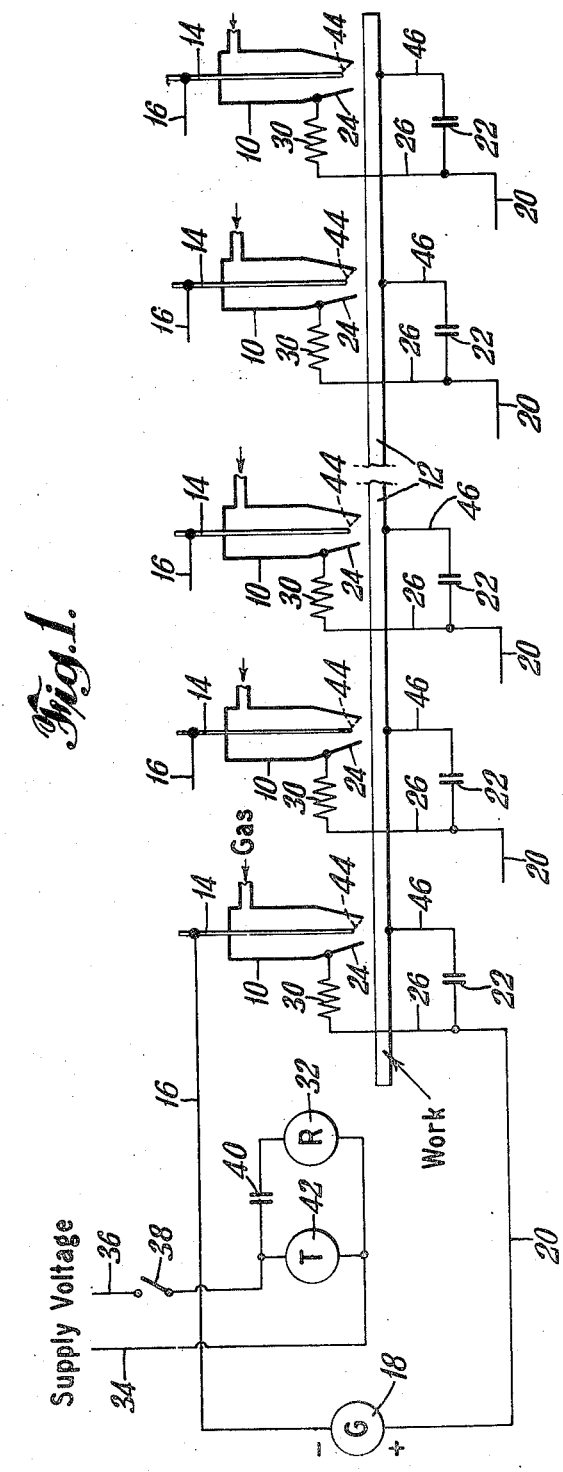
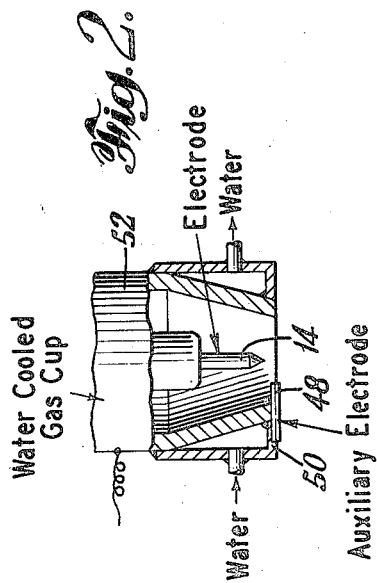
INVENTOR
HOWARD R. MILLER
BY
Barnwell R. King
ATTORNEY United States Patent Office 2,798,937
Patented July 9, 1957

2,798,937

MULTIPLE ARC TIMING SYSTEM

Howard R. Miller, Clark, N. J., assignor to Union Carbide and Carbon Corporation, a corporation of New York Application May 16, 1955, Serial No. 508,728

6 Claims. (Cl. 219—131)

This invention relates to arc timing systems for arc working and more particularly to multiple inert gas shielded arc welding.

According to the invention there is provided an arc timing system which comprises a circuit for energizing a pilot-arc between an auxiliary or secondary electrode, such as the cup, and the primary electrode of a gas shielded arc torch, for example, from a suitable source of electric current through a current limiting resistor. Such system also comprises means including a timer for connecting such source of electric current directly across such primary electrode and a workpiece, initiating a main arc therebetween which is energized until such timer disconnects the workpiece from such source, thereby automatically extinguishing the main arc, but not the pilot-arc which continues to be energized by such source. The operation of such pilot-arc may be continuous throughout successive main arc "on" and "off" cycles during the operation of the system.

More specifically, according to the invention, a battery of inert gas shielded arc welding torches are provided to multiple-spot weld in unison each of a succession of workpieces which are connected one after the other to the system. The pilot-arcs, all of which are energized, serve to provide instantaneous starting and stable operation of each and all of the main arcs in unison without fail as each workpiece is presented. Each pilot-arc preferably is energized by a direct current source.

Advantages produced by a direct current pilot-arc are: (1) The electrode tip is kept hot at all times. (2) An atmosphere of ionized gas is maintained around the electrode. (3) Reliable starting is assured even for spot welding. (4) The main arc current may be either D. C. or A. C. The use of objectionable high-frequency may be entirely avoided.

In the drawing:

Fig. 1 is a circuit diagram of a multiple arc system illustrating the invention; and Fig. 2 is an enlarged fragmentary view partly in side elevation and partly in section of a torch embodying a modification of the invention.

As shown in Fig. 1 a number of inert gas shielded arc welding torches 10 are mounted to spot-weld a workpiece 12 at spaced points. Each electrode 14 of such torches is connected by a lead 16 to the negative terminal of a suitable source of direct current 18, the positive terminal of which is connected to the workpiece 12 by a lead 20 and a normally open contactor 22. The metal cup 24 of each torch is connected to such lead 20 by a conductor 26 containing a suitable resistance 30. While the torches are each preferably connected to a separate source of power, all of them may be connected in parallel to the same power source. The contactors 22 are operated in unison by a single relay 32 that is connected by conductors 34 and 36 to a suitable source of supply voltage through a main switch 38 and the normally open contactor 40 of a timing relay 42.

In operation each D. C. source 18 energizes a pilot arc 44 between each primary electrode 14 and the corresponding cup 24, which thus serves as a secondary electrode, of each torch 10. Such pilot-arcs can be started in any suitable well-known manner, such as by high-frequency, retract starting, shorting, condenser discharge, etc. The D. C. pilot-arcs 44 are all operated in unison. The workpiece 12 is connected to one side of the open contactors 22 through conductors 46, and switch 38 is closed. This results in the energization of the timer 42 and closure of contactor 40; and relay 32 is energized, closing all of the contactors 22. Each of the primary electrodes 14 and the workpiece 12 thus are connected across the D. C. source 18 of each torch, and welding arcs are automatically established simultaneously between the workpiece and each of such primary electrodes 14 at the same instant. When the timer 42 completes its cycle, contactor 40 opens, de-energizing welding relay 32, and contactors 22 automatically open at the same time, while the D. C. pilot-arcs continue to operate.

Testing copper gas cups, and welding arc gaps ranging between a minimum of 0.063-inch and a maximum of 0.500-inch, many consecutive starts were made. Such range of arc gaps approximates those normal for the process. Gas flows through the cups were varied from 5 C. F. H. of argon to greater than 60 C. F. H. while cup-to-work distance was varied between 0.010 and 0.500-inch.

The operating temperature of a 0.500-inch I. D. cup was found to be too low to enable a D. C. pilot-arc to be maintained. Such low temperature is probably the result of cooling water being introduced at the lower extremities of the gas cup. As shown in Fig. 2, in order to maintain a stable pilot-arc, an auxiliary tungsten electrode 48 was welded (silver-soldered) to the rim 50 of a cup 52 in a groove provided therefore. Using such arrangement, with a pilot-arc current of 10 amperes, and a gas flow of 5 C. F. H. of argon, thousands of consecutive spot-welds were made without a failure.

The auxiliary electrode may be, as noted above, the conventional, copper gas-cup, except in those cases where the distance between the electrode and the gas cup is too great to maintain such an arc. In such cases the gap may be reduced by means of a secondary electrode such as a tungsten probe mounted in or on the cup as pointed out above.

In an actual setup the pilot-arc current was controlled by placing two 1000-watt lamps in series with such pilot arc. The use of this arrangement limited the current to approximately 10 amperes. A resistor or some other current-limiting device could be used in place of such lamps without affecting the operation of the invention. The pilot-arc current need not necessarily be limited to 10 amperes, but the employment of lower currents tends to make the pilot-arc less stable, while raising the current produces excessive heat in the auxiliary electrode and also tends to shorten the life of such electrode.

After establishing the D. C. pilot-arc, the main welding arc can be initiated or extinguished by merely closing or opening the contactor in the work circuit. With D. C. pilot-arc starting of the invention, it is not necessary to touch the electrode to the work to initiate the main arc. Successful starting has been obtained when the pilot-arc current diminishes during welding and increases when the main arc stops. Apparently, the relative value of electrode-to-work and electrode-to-auxiliary electrode distances determine what value of pilot-arc current will be maintained during welding.

The invention is not limited to spot-welding, but is suitable for lineal welding as well as other arc working such as cutting, severing, piercing and the like. In the case of A. C. main arcs the D. C. pilot-arcs are energized by a separate power supply.

I claim:
1. An arc timing system comprising the combination of a plurality of arc torches each comprising a primary and a secondary electrode, means for energizing a pilot-arc between such electrodes of each torch, said pilot arc acting to keep the end of the corresponding primary electrode in each torch in a condition hot enough for starting a main arc between such primary electrode and a workpiece when the latter are connected to a source of current, and means including a timer for connecting each of such primary electrodes and such workpiece to such source of current, automatically starting in unison a main arc between each of said primary electrodes and the workpiece.

2. An arc timing system comprising the combination of a primary electrode, a secondary electrode mounted adjacent to said primary electrode, a source of pilot-arc current connected in circuit relation with said primary and secondary electrodes for energizing a pilot-arc therebetween, means including a timer for connecting a workpiece and said primary electrode in circuit with a source of main arc current while such pilot-arc is operating, the effect of which is to initiate a main arc between said primary electrode and workpiece, which main arc operates until such workpiece is disconnected from said main arc current source by the operation of said timer, said pilot-arc acting to keep the end of said primary electrode in a condition hot enough for starting the next main arc when a workpiece is again connected to the welding current source by said timer.

3. An arc welding system as defined by claim 2, in which said source of pilot-arc current comprises said main arc current source and a resistor in series therewith.

4. The combination with an inert gas shielded arc torch comprising a metal cup from which gas is discharged around a non-consumable metal electrode, which cup and electrode are electrically insulated from each other, of a source of current connected across said cup and electrode, which energizes a D. C. pilot-arc therebetween which keeps the end of said electrode sufficiently hot to initiate a main arc between such electrode and a workpiece when the latter are connected to a source of current, and means for connecting a source of current across said electrode and a workpiece for energizing a main arc therebetween, which is initiated by said D. C. pilot-arc, including timing means which disconnects such workpiece, thereby extinguishing the main arc.

5. Process of timing a main arc between primary electrodes which comprises maintaining a D. C. pilot-arc between one of such primary electrodes and a secondary electrode which keeps the end of said primary electrode sufficiently hot to initiate a main arc between such primary electrode and a workpiece when the latter are connected to a source of current, connecting such primary electrodes to source of current, whereupon the main arc starts automatically, and disconnecting one of such primary electrodes from such source, which automatically stops such main arc.

6. The combination of a timer, with an inert gas shielded arc torch comprising a metal cup from which gas is discharged around a non-consumable metal electrode, which cup and electrode are electrically insulated from each other, a source of current connected across said cup and electrode, which energizes a D. C. pilot-arc therebetween which keeps the end of said electrode sufficiently hot to initiate a main arc between such electrode and a workpiece when the latter are connected to a source of current, and means operatively associated with said timer for connecting a source of current across said electrode and a workpiece for energizing a main arc therebetween, which is initiated by said D. C. pilot-arc.

References Cited in the file of this patent
UNITED STATES PATENTS

| | | |
|---|---|---|
| 2,516,016 | Pakala | July 18, 1950 |
| 2,516,037 | Williams | July 18, 1950 |
| 2,620,422 | Volff | Dec. 2, 1952 |